United States Patent
Stojanovski et al.

(10) Patent No.: US 12,010,615 B2
(45) Date of Patent: Jun. 11, 2024

(54) MOBILE DEVICE CONTEXT TRANSFER IN A 5G SYSTEM

(71) Applicant: Apple Inc., Cupertino, CA (US)

(72) Inventors: Alexandre S. Stojanovski, Paris (FR); Robert Zaus, Munich (DE)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 17/283,337

(22) PCT Filed: Oct. 8, 2019

(86) PCT No.: PCT/US2019/055093
§ 371 (c)(1),
(2) Date: Apr. 7, 2021

(87) PCT Pub. No.: WO2020/076750
PCT Pub. Date: Apr. 16, 2020

(65) Prior Publication Data
US 2022/0007280 A1 Jan. 6, 2022

Related U.S. Application Data

(60) Provisional application No. 62/742,762, filed on Oct. 8, 2018.

(51) Int. Cl.
*H04W 48/20* (2009.01)
*H04W 8/02* (2009.01)
(Continued)

(52) U.S. Cl.
CPC .............. *H04W 48/20* (2013.01); *H04W 8/02* (2013.01); *H04W 8/20* (2013.01); *H04W 48/16* (2013.01); *H04W 84/042* (2013.01)

(58) Field of Classification Search
None
See application file for complete search history.

(56) References Cited

U.S. PATENT DOCUMENTS 6,708,217 B1    3/2004 Colson et al.
11,290,974 B2   3/2022 Yu
(Continued)

FOREIGN PATENT DOCUMENTS

CN    101843126    9/2010
CN    103081538    5/2013
(Continued)

OTHER PUBLICATIONS

Samsung et al., "Discussion on registration result IE", 3GPP CT WG1 Meeting #111, C1-183332, May 20, 2018, 3 sheets.
(Continued)

*Primary Examiner* — Frantz Bataille
(74) *Attorney, Agent, or Firm* — Fay Kaplun & Marcin, LLP

(57) ABSTRACT

An apparatus of an Access and Mobility Function (AMF) comprises one or more baseband processors to process a request from a new AMF for a user equipment (UE) context transfer for a UE registered to the AMF via a first access type, wherein UE context transfer request includes an indication of a second access type for the UE to register with the new AMF, and to determine whether an entire UE context should be returned to the new AMF based on the second access type. The apparatus can include a memory to store the request.

16 Claims, 4 Drawing Sheets

(51) Int. Cl.
*H04W 8/20* (2009.01)
*H04W 48/16* (2009.01)
*H04W 84/04* (2009.01)

(56) References Cited

U.S. PATENT DOCUMENTS

| | | |
|---|---|---|
| 2009/0111428 A1 | 4/2009 | Blommaert et al. |
| 2012/0120914 A1 | 5/2012 | Sedlacek et al. |
| 2018/0227842 A1 | 8/2018 | Chandramouli et al. |
| 2018/0270781 A1 | 9/2018 | Baek et al. |
| 2019/0053117 A1* | 2/2019 | Bae .................. H04W 36/125 |
| 2019/0261260 A1* | 8/2019 | Dao .................. H04W 40/20 |

FOREIGN PATENT DOCUMENTS

| | | |
|---|---|---|
| CN | 103190187 | 7/2013 |
| CN | 103701947 | 4/2014 |
| CN | 104854916 | 8/2015 |
| CN | 108401275 | 8/2018 |
| CN | 108574969 | 9/2018 |
| EP | 3691356 | 8/2020 |
| WO | 2018/085187 | 5/2018 |
| WO | 2018/088836 | 5/2018 |

OTHER PUBLICATIONS

Zte, "Discussion on Registration Result", 3GPP CT WG1 Meeting #112, C1-185086, Aug. 13, 2018, 2 sheets.
"Technical Specification Group Services and System Aspects; Procedures for the 5G System; Stage2 (Release 15)", 3GPP TS 23 502, Sep. 17, 2018, 329 sheets.
Huawei et al., "TS 23.502 SMF information context synchronization between old AMF and new AMF", 3GPP SA WG2 Meeting #123, S2-177136, Oct. 23-27, 2017, 17 sheets.
Zhou et al., "Mobility Management Research of Internet based on Split Mechanism", Journal of the China Railway Society, vol. 31 No. 4, Aug. 2009, 10 sheets.
Ericsson, "UE Context Transfer Integrity Check Failure adaptation", 3GPP TSG CT WG4 Meeting #85bis, C4-185160, Jul. 13, 2018, 6 sheets.
Ericsson, "Alignment of terminology and general cleanup", 3GPP TSG-SA WG2 Meeting #126, S2-182630, Mar. 2, 2018, 100 sheets.
Ericsson, "Registration procedure update", S2-186090, 3GPP TSG SA WG2, Jun. 2, 2018.
"3GPP; TSGCT; 5G System; Access and Mobility Management Services; Stage 3 (Release 15)", 3GPP TS 29.518, Sep. 22, 2018.
Intel, "Correction to identifiers in Registration procedure", S2-184806, 3GPP TSG SA WG2, May 22, 2018.
Zte et al., "AMF requests for the PCF policy update of the URSP rules in the UE after the Allowed and/or Configured NSSAI update", S2-187720, 3GPP TSG SA WG2, Aug. 14, 2018.
Ericsson, "AMF relocation due to 3GPP and non-3GPP access", SA WG2 Meeting #122, S2-174194, Jun. 10, 2017, 9 sheets.

* cited by examiner

MOBILE DEVICE CONTEXT TRANSFER IN A 5G SYSTEM

CROSS-REFERENCE TO RELATED APPLICATIONS

The present application claims the benefit of U.S. Provisional Application No. 62/742,762 (AB5908-Z) filed Oct. 8, 2018. Said Application No. 62/742,762 is hereby incorporated herein by reference in its entirety.

BACKGROUND

In Fifth Generation (5G) systems, when the user equipment (UE) performs Initial Registration with the 5G network it needs to indicate an identity to the network. The UE can indicate either its permanent identity such as a Subscription Permanent Identifier (SUPI), encoded as a concealed parameter called a Subscription Concealed Identifier (SUCI), or a temporary identity such as a 5G Globally Unique Temporary Identity (5G-GUTI). The UE can maintain multiple 5G-GUTIs that have been assigned to it by Public Land Mobile Networks (PLMNs) to which the UE was connected in the past.

The choice of the identity to indicate to the network is specified in the Third Generation Partnership Project (3GPP) Technical Standard (TS) 23.502, clause 4.2.2.2.2 as follows. When the UE is performing an Initial Registration, the UE shall indicate its UE identity in the Registration Request message as follows, listed in decreasing order of preference:
- a native 5G-GUTI assigned by the PLMN to which the UE is attempting to register, if available;
- a native 5G-GUTI assigned by an equivalent PLMN to the PLMN to which the UE is attempting to register, if available;
- a native 5G-GUTI assigned by any other PLMN, if available.
- NOTE 1: This can also be a 5G-GUTIs assigned via another access type
- Otherwise, the UE shall include its SUCI in the Registration Request as defined in 3GPP TS 33.501.

There is one scenario, however, where this simple logic for selection of a 5G-GUTI can lead to an error situation. Specifically, consider the following case:
- UE is registered in a first Access and Mobility Function (AMF1) (PLMN1) over access type 1 (e.g. non-3GPP access)
- UE attempts Registration in a second AMF2 (PLMN2) over access type 2 (e.g. 3GPP access)
- PLMN1 and PLMN2 are equivalent PLMNs. UE does not have a valid GUTI for PLMN2, so it provides the GUTI for the equivalent PLMN1.
- AMF2 is able to retrieve AWL but it should fetch only UE's SUPI, without disrupting the UE's Mobility Management (MM) and Session Management (SM) context in AMF1. The current specification does not allow for such an option. According to the current specification text AMF1 will return the entire UE context, which will eventually lead to an error situation where the Protocol Data Unit (PDU) Sessions established over access type 1 will be disrupted.

While this problem has been described in the context of Initial Registration, it also exists in the context of Mobility Registration Update when the latter procedure is performed as part of the mobility procedure for UE returning from an Evolved Packet System (EPS) to the 5G System, for example as described in 3GPP TS 23.502 clause 4.11.1.2.2.3 (step 12) and 3GPP TS 23.502 clause 4.11.2.3 (step 1).

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
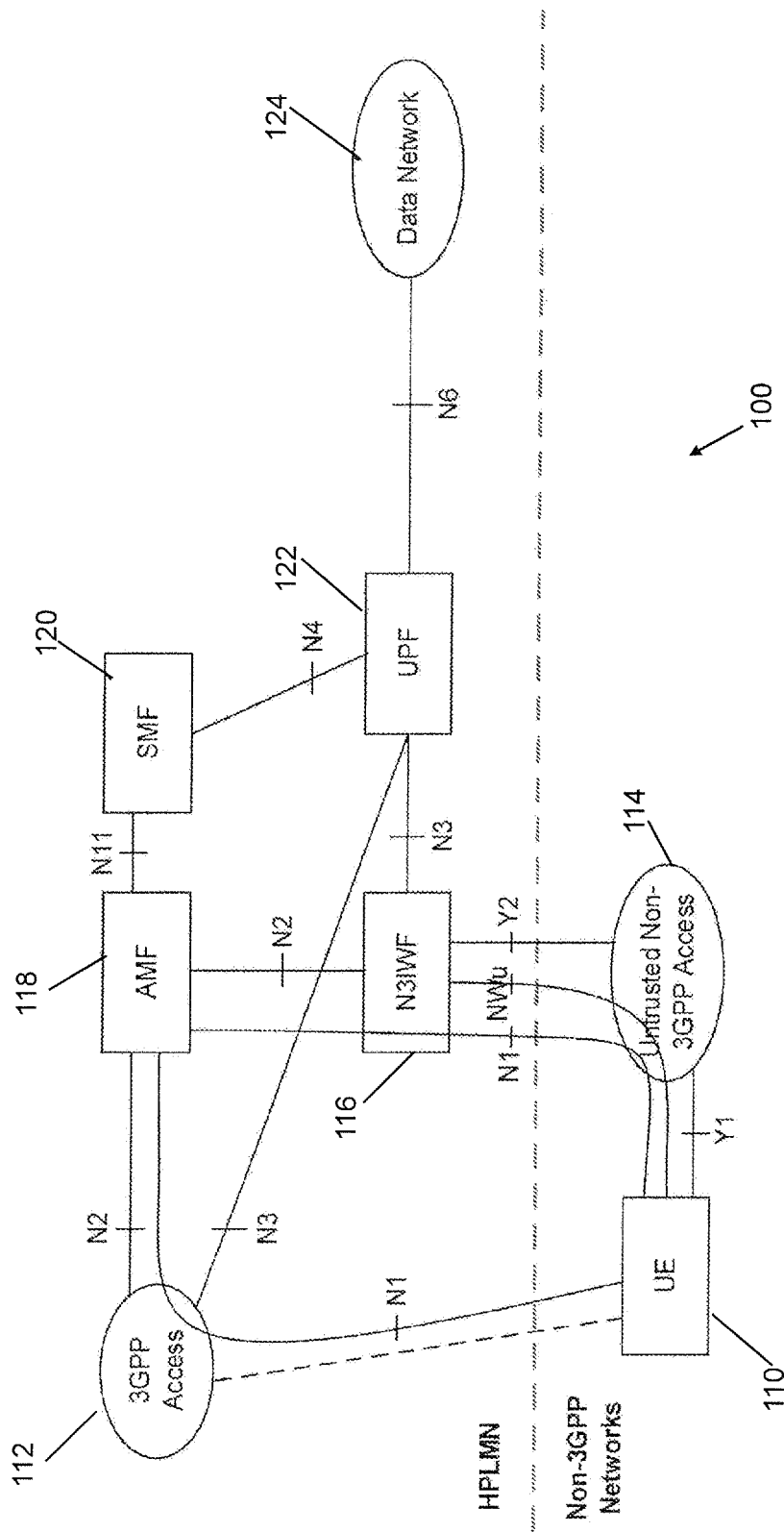
FIG. 1 is a diagram of non-roaming architecture for a Fifth Generation (5G) Core Network for a 5G residential gateway (5G-RG) with wireline 5G access network and a Next Generation Radio Access Network (NG RAN) in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of non-roaming architecture for a Fifth Generation (5G) Core Network for a user equipment (UE) with an untrusted non-3GPP access network, which typically can be a wireless local area network (WLAN) such as a Wi-Fi network, and a Next Generation Radio Access Network (NG RAN) in accordance with one or more embodiments will be discussed. FIG. 1 shows an example architecture 100 in which a UE 110 can connect to the network via Third Generation Partnership Project (3GPP) Access 112 or via untrusted non-3GPP access 114. In some examples, the untrusted non-3GPP access network 114 can be a wireless local area network (WLAN) network. In some examples, the untrusted non-3GPP access network 114 can be connected to a 5G core network through an N3 interface interworking function (N3IWF) 116. Architecture 100 can include Access Management Function (AMF) 118, Session management Function (SMF) 120, and User Plane Function (UPF) 122 to connect to Data Network 124. It should be noted that architecture 100 of FIG. 1 illustrates one example of a UE that can connect to a core network either via 3GPP Access 112 or untrusted non-3GPP access 114 via N3IWF 116, or both, and the scope of the claimed subject matter is not limited in this respect.

In accordance with one or more embodiments, a UE context transfer may be implemented wherein a new AMF requests a UE context transfer from the old AMF. When this occurs, the new AMF can indicate the Access Type in the UE Context Transfer request. The Access Type, in combination with the Public Land Mobile Network (PLMN) identity of the new AMF, allows the old AMF to determine whether it is possible to relocate the N2 interface on the new AMF or not. In the latter case the old AMF only provides UE's Subscription Permanent Identifier (SUPI) with an indication that the Registration Request has been validated for integrity protection. Otherwise, the old AMF will provide the whole UE context to the new AMF and will eventually release the protocol data unit (PDU) Sessions established over the first access. This issue can be addressed as shown in and described with respect to FIG. 2, below.

Figure 2:
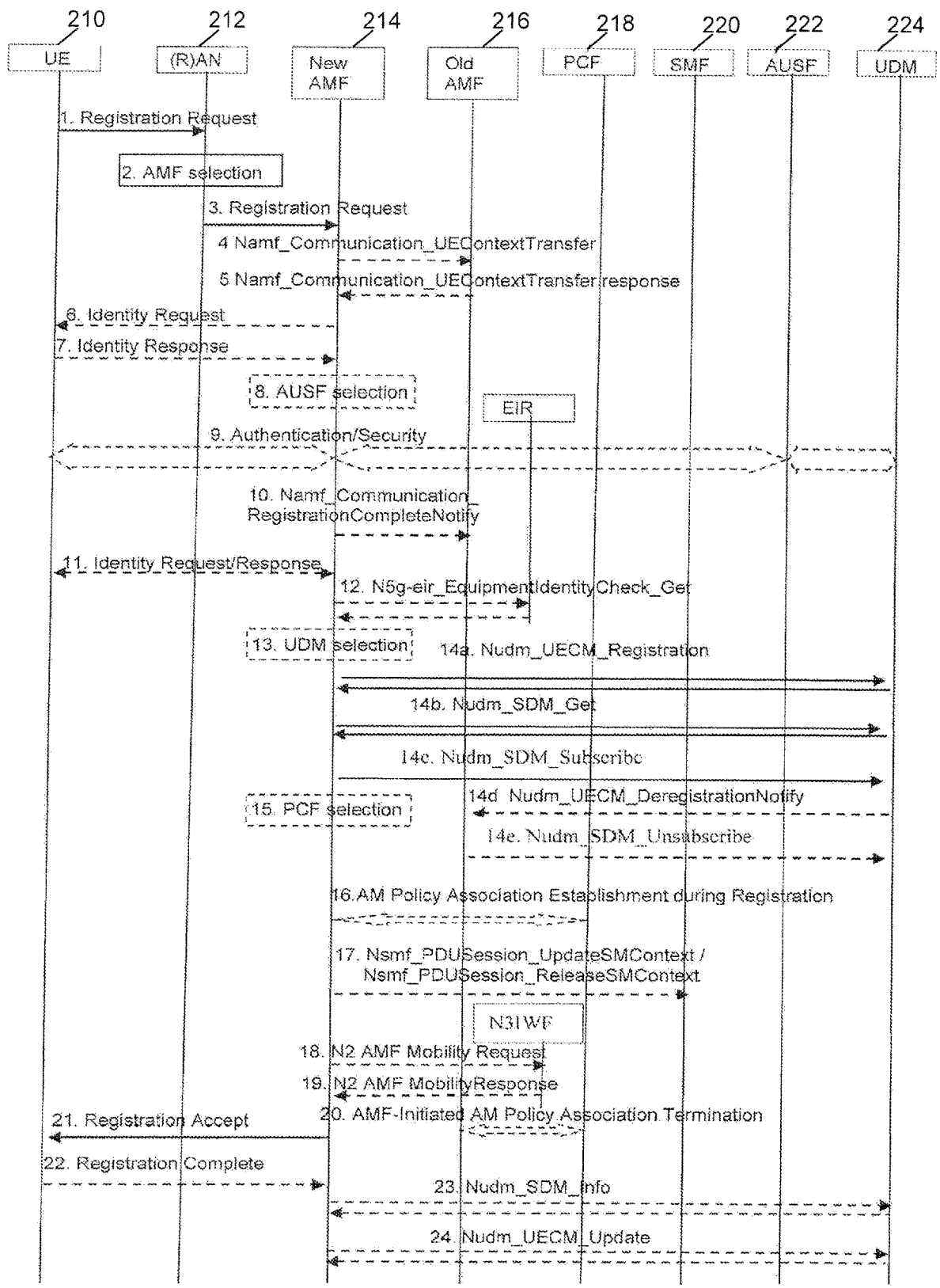
FIG. 2 is a diagram of registration procedure in accordance with one or more embodiments.

FIG. 2 is a diagram of registration procedure in accordance with one or more embodiments. Registration procedure 200 of FIG. 2 illustrates a modification of the call flow as described in Third Generation Partnership Project (3GPP) Technical Specification (TS) 23.502 clause 4.2.2.2.2 (General Registration). The modification is directed to operation 4 (Namf_Communication_UEContextTransfer) and operation 5 (Namf_Communication_UEContextTransfer response) of the registration procedure. It should be noted that where the standard is references, below, modifications or additions to the standard are indicated by underlined text. In general, FIG. 2 shows the registration procedure operations executed by user equipment (UE) 210, access network or radio access network (RAN) 212, the new Access and Mobility Function (AMF) 214, old AMF 216, Policy Control Function (PCF) 218, Session Management Function (SMF) 220, Authentication Server Function (ASF) 222, and Unified Data Management (UDM) 224.

In one or more embodiments, when the new AMF 214 requests UE context transfer from the old AMF 216, the new AMF 214 indicates the Access Type in the UE Context Transfer request. The Access Type, in combination with the PLMN identity of the new AMF 214, allows the old AMF 216 to determine whether it is possible to relocate the N2 interface on the new AMF 214 or not. In the latter case the old AMF 215 only provides the UE's 210 SUPI with an indication that the Registration Request has been validated for integrity protection. Alternatively, the old AMF 216 simply rejects the UE context transfer request. This will lead the new AMF 214 to request the UE identity over the air using the Identity Request procedure.

The logic in the old AMF for determining whether the N2 interface can be relocated to the new AMF can be described with the following algorithm:

```
IF PLMN identity (new AMF) = PLMN identity (old AMF) THEN
        Relocation of N2 is possible /* assumption is that the network
is 'fully meshed' */
ELSE    /* i.e. PLMN identity (new AMF) ≠ PLMN identity (old AMF)
*/
        IF Access Type (new AMF) = Access Type (old AMF) THEN
              Relocation of N2 is possible (although for Access type =
              "non-3GPP" this requires an initial registration
              towards the new AMF; mobility registration update is
              anyway not applicable)
        ELSE /* i.e. Access Type (new AMF) ≠ Access Type (old
AMF) */
              Relocation of N2 is not possible
        END
END
```

Messaging from the new AMF 214 to the old AMF 216 can involve transmission of a Namf_Communication_UE-ContextTransfer message which includes a complete Registration Request, or from the new AMF 214 to the UDSF can involve transmission of a Nudsf_Unstructured Data Management_Query( ) message. With Unstructured Data Storage Function (UDSF) Deployment, if the UE's 5G-GUTI was included in the Registration Request and the serving AMF has changed since the last Registration procedure, the new AMF 214 and the old AMF are in the same AMF Set and UDSF is deployed, the new AMF 214 retrieves the stored UE's SUPI and UE context directly from the UDSF using the Nudsf_UnstructuredDataManagement_Query service operation or they can share stored UE context via implementation specific means if UDSF is not deployed. This includes also event subscription information by each NF consumer for the given UE. In this case, the new AMF 214 uses integrity protected complete Registration request Non-Access Stratum (NAS) message to perform and verify integrity protection.

Without UDSF Deployment, if the UE's 5G-GUTI was included in the Registration Request and the serving AMF has changed since last Registration procedure, the new AMF may invoke the Namf_Communication_UEContextTransfer service operation on the old AMF 216 including the complete Registration Request NAS message, which may be integrity protected, as well as the Access Type, to request the UE's SUPI and UE Context. See 3GPP TS 23.502 clause 5.2.2.2.2 for details of this service operation. In this case, the old AMF 216 uses either 5G-GUTI and the integrity protected complete Registration request NAS message, or the SUPI and an indication that the UE 210 is validated from the new AMF 214, to verify integrity protection if the context transfer service operation invocation corresponds to the UE 210 requested. The old AMF 216 also transfers the event subscriptions information by each NF consumer, for the UE 210, to the new AMF 214.

In one or more embodiments, if the old AMF 216 has PDU Sessions for another access type, different from the Access Type indicated in this operation, and if the old AMF 216 determines that there is no possibility for relocating the N2 interface to the new AMF 214, the old AMF 216 returns UE's SUPI and indicates that the Registration Request has been successfully validated for integrity protection, but does not include the rest of the UE context.

Alternatively, if the old AMF 216 has PDU Sessions for another access type, different from the Access Type indicated in this operation, and if the old AMF 216 determines that there is no possibility for relocating the N2 interface to the new AMF 214, the old AMF 216 rejects the UE context transfer request. In case of rejection, the new AMF 214 uses the Identity Request message (operation 6) to request UE's identity.

NOTE 3: The new AMF sets the indication that the UE is validated according to step 9a, in case the new AMF has performed successful UE authentication after previous integrity check failure in the old AMF.

NOTE 4: The NF consumers does not need to subscribe for the events once again with the new AMF after the UE is successfully registered with the new AMF.

If the new AMF 214 has already received UE contexts from the old AMF 216 during handover procedure, then operation 4, operation 5, and operation 10 can be skipped.

For an Emergency Registration, if the UE 210 identifies itself with a 5G-GUTI that is not known to the AMF, operation 4 and operation 5 can be skipped and the AMF immediately requests the SUPI from the UE 210. If the UE 210 identifies itself with PEI, the SUPI request shall be skipped. Allowing Emergency Registration without a user identity is dependent on local regulations.

Messaging from the old AMF 216 to the new AMF 214 can involve transmission of the Response to Namf_Communication_UEContextTransfer (SUPI, UE Context in AMF as per Table 5.2.2.2.2-1)) or from the UDSF to the new AMF 214 or the Nudsf_Unstructured Data Management_Query( ). The old AMF 216 may start an implementation specific (guard) timer for the UE context. The UE Context in AMF (as per Table 5.2.2.2.2-1) is not included in the response if the old AMF 216 determines that there is no possibility for relocation of the N2 interface.

If the UDSF was queried in operation 4, the UDSF responds to the new AMF 214 for the Nudsf_Unstructured Data Management_Query invocation with the related contexts including established PDU Sessions, the old AMF 216 includes SMF information DNN, S-NSSAI(s) and PDU Session ID, active NGAP UE-TNLA bindings to N3IWF, the old AMF 216 includes information about the NGAP UE-TNLA bindings. If the old AMF 216 was queried in operation 4, the old AMF 216 responds to the new AMF 214 for the Namf_Communication_UEContextTransfer invocation by including the UE's SUPI and UE Context.

If the old AMF 216 holds information about established PDU Session(s), the old AMF 216 includes SMF information, DNN(s), S-NSSAI(s) and PDU Session ID(s).

If the old AMF 216 holds information about active NGAP UE-TNLA bindings to N3IWF, the old AMF 216 includes information about the NGAP UE-TNLA bindings.

If the old AMF 216 fails the integrity check of the Registration Request NAS message, the old AMF 216 shall indicate the integrity check failure.

If the old AMF 216 holds information about AM Policy Association, the old AMF includes the information about the Access and Mobility (AM) Policy Association including the policy control request trigger and PCF ID. In the roaming case, V-PCF ID and H-PCF ID are included.

In one or more embodiments, the definition of the UE ContextTransfer service in 3GPP TS 23.502 clause 5.2.2.2.2 can be updated accordingly, as follows.

5.2.2.2.2 Namf_Communication_UEContextTransfer service operation

Service operation name: Namf_Communication_UEContextTransfer

Description: Provides the UE context to the consumer NF.

Input, Required: 5G-GUTI or SUPI, Access Type, Reason.

Input, Optional: Integrity protected message from the UE that triggers the context transfer.

Output, Required: The UE context of the identified UE or only the SUPI and an indication that the Registration Request has been validated. The UE context is detailed in Table 5.2.2.2.2-1.

Output, Optional: Mobile Equipment Identifier (if available), Allowed NSSAI, Mapping Of Allowed NSSAI.

See clause 4.2.2.2.2 for example of usage of this service operation. If the consumer NF sent an integrity protected message from the UE, the AMF uses it to verify whether this request is permitted to retrieve the UE context of the UE. If it is permitted, the AMF provides UE context to the consumer NF in the Namf_Communication_UEContextTransfer response. The following table illustrates the UE Context:

TABLE 5.2.2.2.2-1

| Field | Description |
|---|---|
| SUPI | SUPI (Subscription Permanent Identifier) subscriber's permanent identity in 5GS. |
| SUPI-unauthenticated-indicator | This indicates whether the SUPI is unauthenticated. |
| GPSI | The GPSI(s) of the UE. The presence is dictated by its storage in the UDM. |
| 5G-GUTI | 5G Globally Unique Temporary Identifier. |
| PEI | Mobile Equipment Identity |
| Internal Group ID-list | List of the subscribed internal group(s) that the UE belongs to. |
| UE Specific DRX Parameters | UE specific DRX parameters. |
| UE MM Network Capability | Indicates the UE MM network capabilities. |
| 5GMM Capability | Includes other UE capabilities related to 5GCN or interworking with EPS. |
| Events Subscription | List of the event subscriptions by other CP NFs. Indicating the events being subscribed as well as any information on how to send the corresponding notifications |
| AM Policy Association Information includes the AM Policy Information and the PCF ID(s) below | |
| AM Policy Information | Information on AM policy provided by PCF. Includes the Policy Control Request Triggers and the Policy Control Request Information. Includes the authorized RFSP and the authorized Service Area Restrictions. |
| PCF ID(s) | The identifier of the PCF for AM Policy. In roaming, the identifier of V-PCF and H-PCF (NOTE 1). |
| Subscribed RFSP Index | An index to specific RRM configuration in the NG-RAN that is received from the UDM. |
| RFSP Index in Use | An index to specific RRM configuration in the NG-RAN that is currently in use. |
| MICO Mode Indication | Indicates the MICO Mode for the UE. |
| Voice Support Match Indicator | An indication whether the UE radio capabilities are compatible with the network configuration. The AMF uses it as an input for setting the IMS voice over PS Session Supported Indication over 3GPP access. |

TABLE 5.2.2.2.2-1-continued

UE Context in AMF

| Field | Description |
| --- | --- |
| Homogenous Support of IMS Voice over PS Sessions | Indicates per UE if "IMS Voice over PS Sessions" is homogeneously supported in all TAs in the serving AMF or homogeneously not supported, or, support is non-homogeneous/unknown, see clause 5.16.3.3 of TS 23.501 [2], |
| UE Radio Capability for Paging Information | Information used by the NG-RAN to enhance the paging towards the UE (see clause 5.4.4.1 of TS 23.501 [2]). |
| Information On Recommended Cells And RAN nodes For Paging | Information sent by the NG-RAN, and used by the AMF when paging the UE to help determining the NG-RAN nodes to be paged as well as to provide the information on recommended cells to each of these NG-RAN nodes, in order to optimize the probability of successful paging while minimizing the signalling load on the radio path. |
| UE Radio Capability Information | Information sent by the NG-RAN node and stored in the AMF. The AMF sends this information to the NG-RAN node within the UE context during transition to CM-CONNECTED state. |
| SMSF Identifier | The Identifier of the SMSF serving the UE in RM-REGISTERED state. |
| SMSF Address | The Address of the SMSF serving the UE in RM-REGISTERED state, (see clause 4.13.3.1). |
| SMS Subscription | Indicates subscription to any SMS delivery service over NAS irrespective of access type. |
| SEAF data | Master security information received from AUSF |
| Last used EPS PLMN ID | The identifier of the last used EPS PLMN |
| For each access type level context within the UE access and mobility context: | |
| Access Type | Indicates the access type for this context. |
| RM State | Registration management state. |
| Registration Area | Current Registration Area (a set of tracking areas in TAI List). |
| TAI of last Registration Update | TAI of the TA in which the last registration request was initiated. |
| User Location Information | Information on user location. |
| Mobility Restrictions | Mobility Restrictions restrict mobility handling or service access of a UE. It consists of RAT restriction, Forbidden area, Service area restrictions and Core Network type restriction. |

TABLE 5.2.2.2.2-1-continued

UE Context in AMF

| Field | Description |
| --- | --- |
| Expected UE Behavior Parameters for AMF | Indicates per UE the Expected UE Behavior Parameters and their corresponding validity times. |
| Security Information for CP | As defined in TS 33.501 [15]. |
| Security Information for UP | As defined in TS 33.501 [15]. |
| Allowed NSSAI | Allowed NSSAI consisting of one or more S-NSSAIs for serving PLMN in the present Registration Area. |
| Mapping Of Allowed NSSAI | Mapping Of Allowed NSSAI is the mapping of each S-NSSAI of the Allowed NSSAI to the S-NSSAIs of the Subscribed S-NSSAIs. |
| AMF UE NGAP ID | Identifies the UE association over the NG interface within the AMF as defined in TS 38.413 [10]. |
| RANUENGAPID | Identifies the UE association over the NG interface within the NG-RAN node as defined in TS 38.413 [10]. |
| Network Slice Instance(s) | The Network Slice Instances selected by 5GC for this UE. |
| For each PDU Session level context: | |
| S-NSSAI(s) | The S-NSSAI(s) associated to the PDU Session. |
| DNN | The associated DNN for the PDU Session. |
| Network Slice Instance id | The network Slice Instance information for the PDU Session |
| PDU Session ID | The identifier of the PDU Session. |
| SMF Information | The associated SMF identifier and SMF address for the PDU Session. |
| Access Type | The current access type for this PDU Session. |
| EBI-ARP list | The allocated EBI and associated ARP pairs for this PDU session. |
| 5GSM Core Network Capability | The UEs 5GSM Core Network cCapability as defined in TS 23.501 [2] clause 5.4.4b. |

NOTE 1:
The AMF transfers the PCF ID to the SMF during PDU Session Establishment. The SMF may select the PCF identified by the PCF ID as described in TS 23.501 [2], clause 6.3.7.1. In HR roaming case, the AMF transfers the identifier of H-PCF as described in clause 4.3.2.2.2. In LBO roaming case, the AMF transfers the identifier of V-PCF as described in clause 4.3.2.2.1.

There is also the addition of "accessType" and "plmnId" (of the target AMF which is the new AMF 214) in 3GPP TS 29.518 in clause 6.1.6.2.23 Type: UeContextTransferReqData as shown in Table 6.1.6.2.23-1 below.

TABLE 6.1.6.2.23-1

Definition of type UeContextTransferReqData

| Attribute name | Data type | P | Cardinality | Description |
| --- | --- | --- | --- | --- |
| reason | TransferReason | M | 1 | Indicate the reason for the UEContextTransfer service request |
| accessType | AccessType | M | 1 | This IE shall contain the access type of the UE. |
| plmnId | PlmnId | O | 0 . . . 1 | If present, this IE shall contain the PLMN ID of the NF service consumer (e.g target AMF). |
| regRequest | N1MessageContainer | O | 0 . . . 1 | If present, this IE shall refer to the registration request message which triggers the UE Context Transfer. The message class shall be "5GMM" |

TABLE 6.1.6.2.23-1-continued

Definition of type UeContextTransferReqData

| Attribute name | Data type | P | Cardinality | Description |
|---|---|---|---|---|
| supportedFeatures | SupportedFeatures | C | 0 ... 1 | and message content shall be reference to N1 Message Content binary data, See clause 6.1.6.4.2. This IE shall be present if at least one optional feature defined in clause 6.1.8 is supported. |

Figure 3:
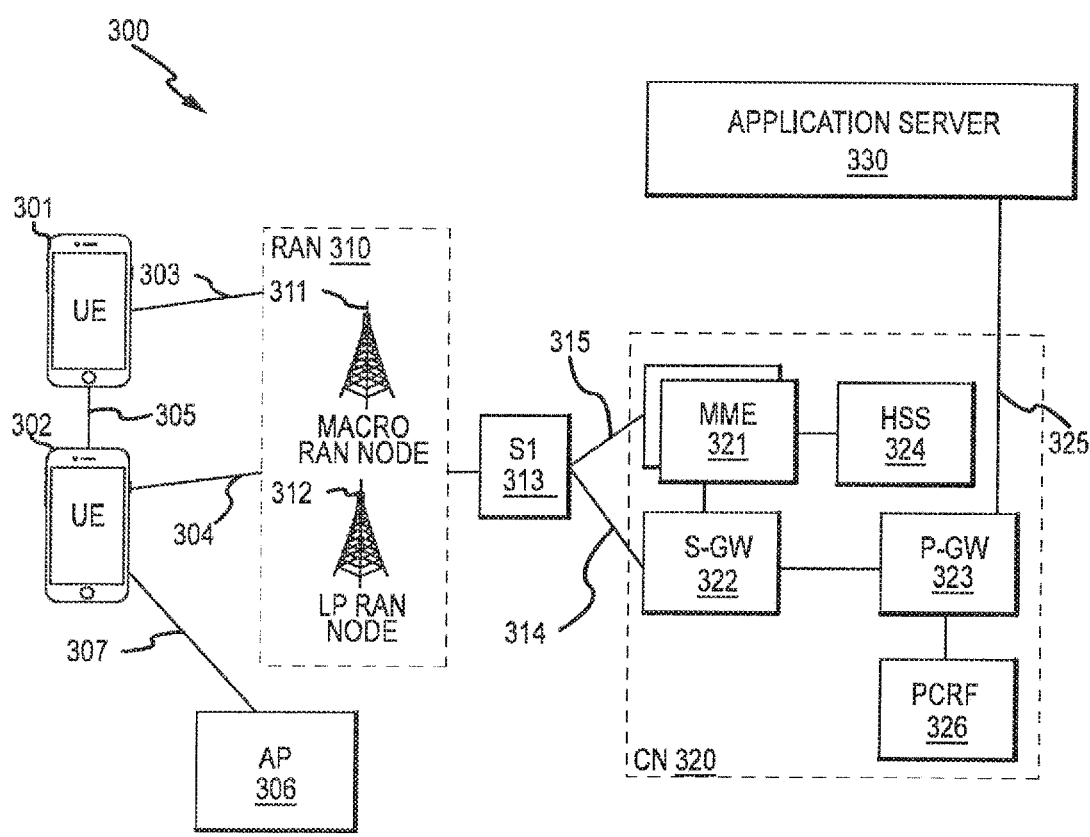
FIG. 3 illustrates an architecture of a system of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
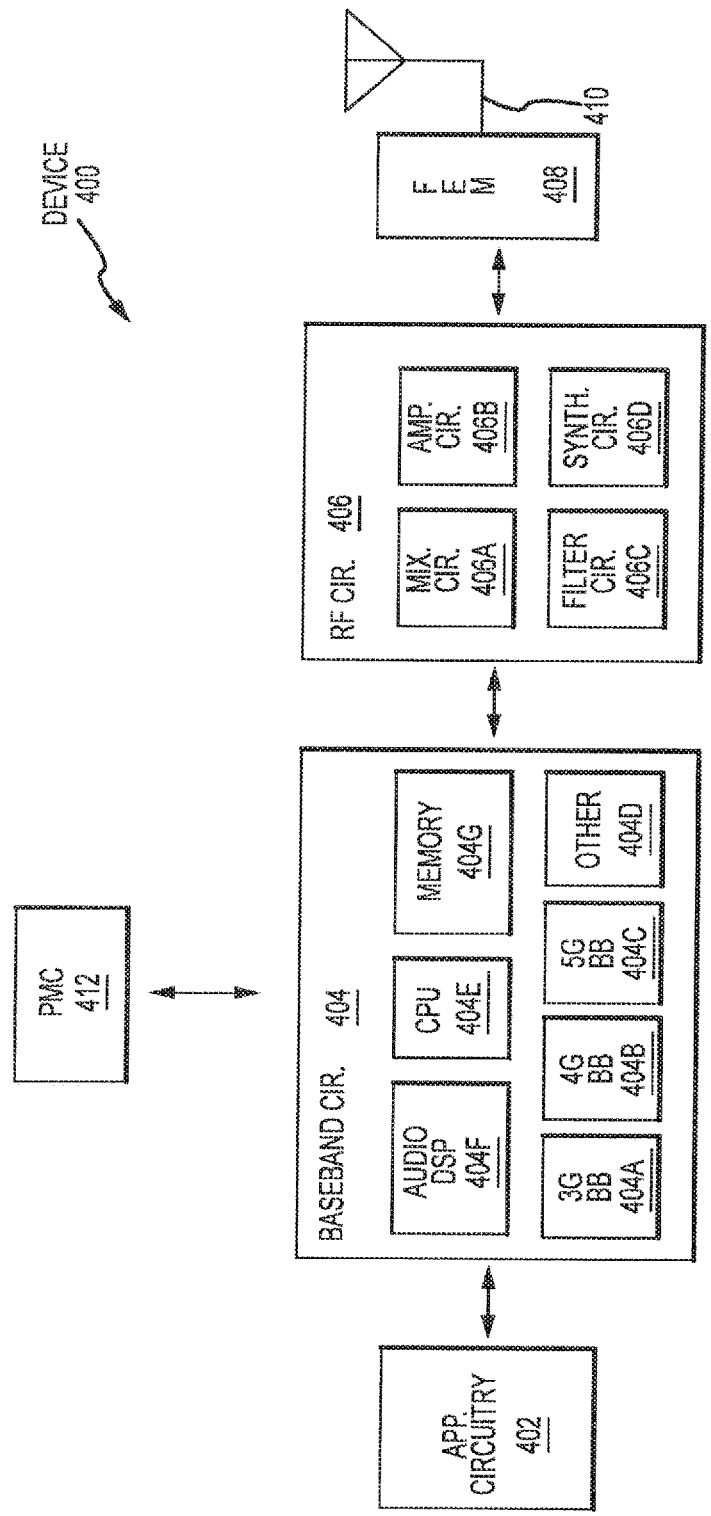
FIG. 4 illustrates example components of a device in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect. In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. In other embodiments, however, the PMC 412 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node.

The following are example implementations of the subject matter described herein. In example one, an apparatus of an Access and Mobility Function (AMF) comprises one or more processors to process a request from a new AMF for a user equipment (UE) context transfer for a UE registered to the AMF via a first access type, wherein UE context transfer request includes an indication of a second access type for the UE to register with the new AMF, and to determine whether an entire UE context should be returned to the new AMF based on the second access type, and a memory to store the request. In example two, the first access type and the second access type is any type of a non-3GPP access or a 3GPP access. In example three, the AMF is to determine whether the entire UE context should be returned to the new AMF if the first access type is non-3GPP access and the second access type is 3GPP access. In example four, the one or more processors further are to determine whether the entire UE context should be returned to the new AMF based on a Public Land Mobile Network (PLMN) identity of the new AMF. In example five, the one or more processors are to return a permanent identifier of the UE, and an indication to the new AMF that a registration request procedure is validated for integrity protection when it is determined to not return the entire UE context. In example six, the one or more processors are to send a rejection of the UE context transfer request with an appropriate cause when it is determined to not return the entire UE context.

In example seven, an apparatus of an Access and Mobility Function (AMF) comprises one or more processors to receive a registration request from a user equipment (UE) registered to an old AMF via a first access type, and to send a request to the old AMF for a UE context transfer, wherein the UE context transfer request includes an indication of a second access type for the UE via which to register with the AMF, and a memory to store the registration request. In example eight, the first access type and the second access type is any type of a non-3GPP access or a 3GPP access. In example nine, the AMF is to determine whether the entire UE context should be returned to the new AMF if the first access type is non-3GPP access and the second access type is 3GPP access. In example ten, the registration request includes a native temporary identifier for the UE that is associated with a Public Land Mobile Network (PLMN) of the old AMF. In example eleven, the one or more processors are to receive a permanent identifier of the UE from the old AMF, and an indication that a registration request procedure is validated for integrity protection. In example twelve, the one or more processors are to receive a rejection of the UE context transfer request with an appropriate cause.

In example thirteen, one or more machine readable media have instructions thereon that, when executed by an apparatus of an Access and Mobility Function (AMF), result in processing a request from a new AMF for a user equipment (UE) context transfer for a UE registered to the AMF via a first access type, wherein UE context transfer request includes an indication of a second access type for the UE via which to register with the new AMF, and determining whether an entire UE context should be returned to the new AMF based on the second access type. In example fourteen, the first access type and the second access type is any type of a non-3GPP access or a 3GPP access. In example fifteen, the AMF is to determine whether the entire UE context should be returned to the new AMF if the first access type is non-3GPP access and the second access type is 3GPP access. In example sixteen, the instructions, when executed, further result in determining whether the entire UE context should be returned to the new AMF based on a Public Land Mobile Network (PLMN) identity of the new AMF. In example seventeen, the instructions, when executed, further result in returning a permanent identifier of the UE, and an indication to the new AMF that a registration request procedure is validated for integrity protection when it is determined to not return the entire UE context. In example eighteen, the instructions, when executed, further result in sending a rejection of the UE context transfer request with an appropriate cause when it is determined to not return the entire UE context.

In example nineteen, one or more machine readable media have instructions thereon that, when executed by an apparatus of an Access and Mobility Function (AMF), result in receiving a registration request from a user equipment (UE) registered to an old AMF via a first access type, and sending a request to the old AMF for a UE context transfer, wherein the UE context transfer request includes an indication of a second access type for the UE via which to register with the AMF. In example twenty, the first access type and the second access type is any type of a non-3GPP access or a 3GPP access. In example twenty-one, the AMF is to determine whether the entire UE context should be returned to the new AMF if the first access type is non-3GPP access and the second access type is 3GPP access. In example twenty-two, the registration request includes a native temporary identifier for the UE that is associated with a Public Land Mobile Network (PLMN) of the old AMF. In example twenty-three, the instructions, when executed, further result in receiving a permanent identifier of the UE from the old AMF, and an indication to that a registration request procedure is validated for integrity protection. In example twenty-four, the instructions, when executed, further result in receiving a rejection of the UE context transfer request with an appropriate cause.

Although the claimed subject matter has been described with a certain degree of particularity, it should be recognized that elements thereof may be altered by persons skilled in the art without departing from the spirit and/or scope of claimed subject matter. It is believed that the subject matter pertaining to mobile device context transfer in a 5G system and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. One or more processors of an Access and Mobility Function (AMF) configured to perform operations comprising:
   receiving a request from a new AMF for a user equipment (UE) context transfer for a UE registered to the AMF with a first access type, wherein the request includes an indication of a second access type for the UE to register with the new AMF;
   determining that an interface cannot be relocated to the new AMF; and
   returning to the new AMF a subscription permanent identifier (SUPI) of the UE and an indication that a registration request procedure is validated for integrity protection without including an entire UE context in response to determining that the interface cannot be relocated to the new AMF.

2. The one or more processors of claim 1, wherein the first access type and the second access type are any type of a non-3GPP access or a 3GPP access.

3. The one or more processors of claim 1, the operations further comprising:
   determining whether the entire UE context should be returned to the new AlVIF if the first access type is non-3GPP access and the second access type is 3GPP access.

4. The one or more processors of claim 1, the operations further comprising:
   determining whether the entire UE context should be returned to the new AMF based on a Public Land Mobile Network (PLMN) identity of the new AMF.

5. The one or more processors of claim 1, wherein the one or more processors are to the operations further comprising: send a rejection of the UE context transfer request with an appropriate cause when it is determined to not return the entire UE context.

6. One or more processors of an Access and Mobility Function (AMF) configured to perform operations, the operations comprising:
   receiving a registration request from a user equipment (UE) registered to an old AMF with a first access type;
   sending a request to the old AMF for a UE context transfer, wherein the UE context transfer request includes an indication of a second access type for the UE with which to register with the AMF; and
   receiving from the old AMF a subscription permanent identifier (SUPI) of the UE and an indication that a registration request procedure is validated for integrity protection without including an entire UE context.

7. The one or more processors of claim 6, wherein the first access type and the second access type is any type of a non-3GPP access or a 3GPP access.

8. The one or more processors of claim 6, wherein the registration request includes a native temporary identifier for the UE that is associated with a Public Land Mobile Network (PLMN) of the old AMF.

9. The one or more processors of claim 6, the operations further comprising sending a rejection of the UE context transfer request with an appropriate cause.

10. A method of an Access and Mobility Function (AMF) comprising:
    receiving a request from a new AMF for a user equipment (UE) context transfer for a UE registered to the AMF a first access type, wherein the request includes an indication of a second access type for the UE via which to register with the new AMF;
    determining that an interface cannot be relocated to the new AMF; and
    returning to the new AMF a subscription permanent identifier (SUPI) of the UE and an indication that a registration request procedure is validated for integrity protection without including an entire UE context in response to determining that the interface cannot be relocated to the new AMF.

11. The method of claim 10, wherein the first access type and the second access type is any type of a non-3GPP access or a 3GPP access.

12. The method of claim 10 further comprising:
    determining whether the entire UE context should be returned to the new AMF if the first access type is non-3GPP access and the second access type is 3GPP access.

13. The method of claim 10 further comprising:
    determining whether the entire UE context should be returned to the new AMF based on a Public Land Mobile Network (PLMN) identity of the new AMF.

14. The method of claim 10 further comprising:
    sending a rejection of the UE context transfer request with an appropriate cause when it is determined to not return the entire UE context.

15. A method of an Access and Mobility Function (AMF) configured to perform operations comprising:
    receiving a registration request from a user equipment (UE) registered to an old AMF via a first access type;
    sending a request to the old AMF for a UE context transfer, wherein the UE context transfer request includes an indication of a second access type for the UE with which to register with the AMF; and
    receiving from the old AMF a subscription permanent identifier (SUPI) of the UE and an indication that a registration request procedure is validated for integrity protection without including an entire UE context.

16. The method of claim 15, wherein the first access type and the second access type is any type of a non-3GPP access or a 3GPP access.

* * * * *